(12) United States Patent
Drennen et al.

(10) Patent No.: US 9,254,913 B2
(45) Date of Patent: Feb. 9, 2016

(54) HYBRID BRAKING SYSTEM AND APPARATUS

(71) Applicant: GOODRICH CORPORATION, Charlotte, NC (US)

(72) Inventors: David B. Drennen, Bellbrook, OH (US); Robert L. French, Beavercreek, OH (US); Kevin E. Rehfus, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 77 days.

(21) Appl. No.: 14/071,875

(22) Filed: Nov. 5, 2013

(65) Prior Publication Data

US 2015/0122593 A1    May 7, 2015

(51) Int. Cl.
| | | |
|---|---|---|
| *B64C 25/44* | (2006.01) | |
| *B60T 13/58* | (2006.01) | |
| *F16D 65/12* | (2006.01) | |
| *F16D 65/18* | (2006.01) | |
| *B60T 13/74* | (2006.01) | |
| *F16D 121/04* | (2012.01) | |
| *F16D 121/24* | (2012.01) | |

(52) U.S. Cl.
CPC .............. *B64C 25/44* (2013.01); *B60T 13/588* (2013.01); *B60T 13/741* (2013.01); *F16D 65/12* (2013.01); *F16D 65/18* (2013.01); *F16D 2121/04* (2013.01); *F16D 2121/24* (2013.01)

(58) Field of Classification Search
CPC ...... B64C 25/44; F16D 65/14; F16D 2121/04; F16D 2121/18; F16D 2121/24; B60T 13/74; B60T 13/741; B60T 13/745
See application file for complete search history.

(56) References Cited

U.S. PATENT DOCUMENTS

| | | | | |
|---|---|---|---|---|
| 4,988,147 | A * | 1/1991 | Zirps | 303/116.4 |
| 5,100,305 | A * | 3/1992 | Zirps | 417/521 |
| 5,220,790 | A * | 6/1993 | Allart et al. | 60/435 |
| 5,390,495 | A * | 2/1995 | Lemaire | 60/442 |
| 6,078,118 | A * | 6/2000 | Reinartz et al. | 310/89 |
| 6,471,015 | B1 * | 10/2002 | Ralea | B60T 8/1703 188/1.11 L |
| 7,204,565 | B2 * | 4/2007 | Hinz et al. | 303/10 |
| 2005/0093367 | A1 * | 5/2005 | Kondo | 303/113.1 |
| 2008/0135349 | A1 * | 6/2008 | Himes et al. | 188/71.5 |
| 2013/0175403 | A1 * | 7/2013 | Spray | 244/235 |
| 2013/0327884 | A1 * | 12/2013 | Yiu | 244/50 |

* cited by examiner

*Primary Examiner* — Vishal Sahni
(74) *Attorney, Agent, or Firm* — Snell & Wilmer L.L.P.

(57) ABSTRACT

The present disclosure relates to hybrid brake systems. The hybrid brake systems may comprise one or more electromechanical actuators and one or more hydraulic adjusters. The hybrid brake system may further comprise a housing configured to store and/or conduct fluid. The hybrid brake system may also further comprise a fluid reservoir. The hybrid brake system may be redundant.

19 Claims, 8 Drawing Sheets

HYBRID BRAKING SYSTEM AND APPARATUS

FIELD

The present disclosure relates to braking systems and, more specifically, to a hybrid electromechanical-hydraulic braking system.

BACKGROUND

Aircraft may employ hydraulic or electromechanical braking systems. Typical hydraulic braking systems employ pistons driven by hydraulic pressure fed from reservoirs. These hydraulic braking systems may be low cost and relatively low weight. On the other hand, electro-mechanical brake systems eliminate the need for all hydraulics which improves field maintenance and reduces environmental risk from to hydraulic leakage.

SUMMARY

In various embodiments, a hybrid brake actuator may comprise a housing (e.g., an actuator plate), an electromechanical actuator (EMA) and a hydraulic adjuster. The housing may be configured to supply a fluid. The EMA may be coupled to the housing. The EMA may be configured to displace the fluid. The hydraulic adjuster may be configured to receive the fluid via the housing and in response to the EMA displacing the fluid. The hydraulic adjuster may be configured to exert a force on a brake system.

In various embodiments, an aircraft brake system may comprise a brake stack and a hybrid brake actuator. The hybrid brake actuator may be configured to operatively couple to and compress the brake stack. The hybrid brake actuator may comprise a housing, a first EMA, a second EMA, a first plurality of hydraulic adjusters, and a second plurality of hydraulic adjusters. The housing may define one or more compression chambers. The first EMA and the second EMA may be operatively coupled to the housing. The first EMA may be configured to displace a fluid in response to a braking command. The second EMA may also be configured to displace the fluid in response to the braking command. The first plurality of hydraulic adjustors may be configured to receive the fluid via the housing and in response to a first compression stroke of the first EMA. The second plurality of hydraulic adjustors may be configured to receive the fluid via the housing and in response to a second compression stroke of the second EMA. The compression chambers may also be configured to hold extra fluid to account for brake wear.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

In various embodiments, a hybrid braking system may employ both electromechanical actuators and hydraulic adjusters. The hydraulic adjusters may be driven by the electromechanical actuators, providing the hybrid braking system with benefits (e.g., force generation) and/or responsiveness of hydraulic actuation while also being made configured as a self-contained system. In this regard, the electromechanical actuators may act to create hydraulic pressure to drive the hydraulic adjusters.

Figure 1A:
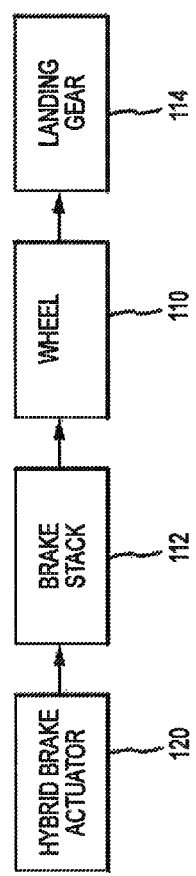
FIG. 1A is a block diagram showing various components of an aircraft, in accordance with various embodiments.

In various embodiments and with reference to FIG. 1A, a hybrid brake actuator 120 may be coupled to and/or configured to attach to brake stack 112. Brake stack 112 may attach and/or be installed on wheel 110. Wheel 110 may attach and/or support landing gear 114 of an aircraft. Hybrid brake actuator 120 may be configured to exert a force on brake stack 112 to slow and/or stop wheel 110. In this regard hybrid actuator 120 may apply a force to a brake stack contained within brake stack 112 to stop an airplane during a landing and/or taxi event (e.g., while the aircraft is on the ground).

Figure 1B:
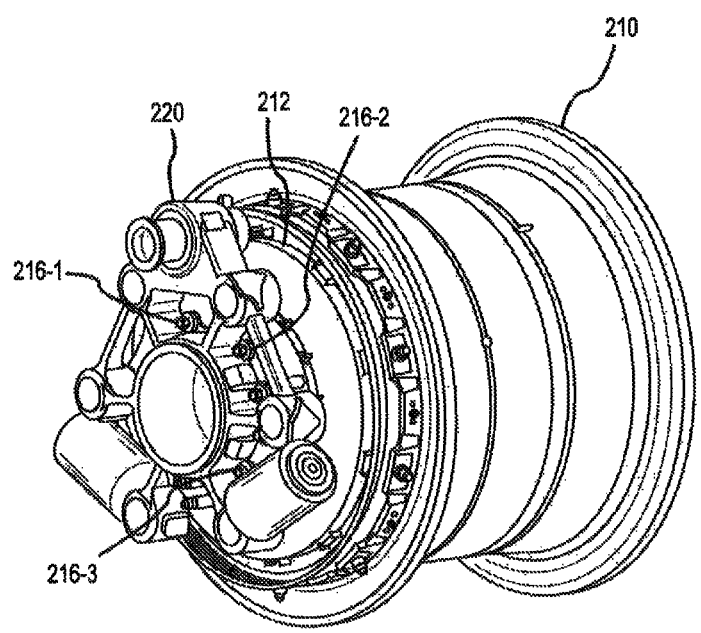
FIG. 1B illustrates a perspective view of a wheel comprising a hybrid brake actuator, in accordance with various embodiments.

In various embodiments and with reference to FIG. 1B, hybrid brake actuator 220 may couple to brake stack 212. Hybrid brake actuator 220 may he coupled to brake stack 212 with any suitable fastener including, for example, fasteners 216-1, 216-2 and 216-3. Brake stack 212 may attach to, couple to, and/or be contained within wheel 210.

Figure 2A:
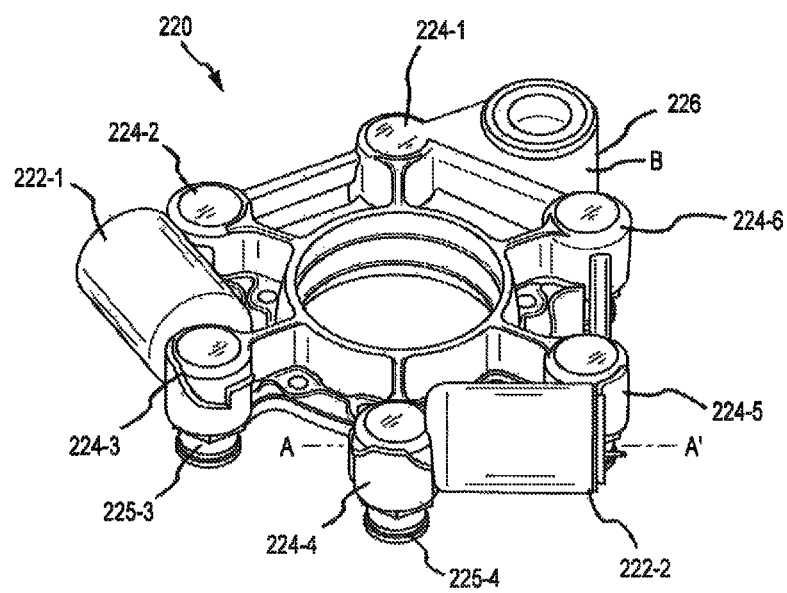
FIG. 2A illustrates a top perspective view of a first hybrid brake actuator, in accordance with various embodiments.

In various embodiments and with reference to the exemplary embodiment shown in FIG. 2A, hybrid brake actuator 220 may comprise one or more electric motor actuators 222 (e.g., shown as EMA 222-1 and EMA 222-2). EMA 222 may be coupled to and/or attached to housing 226 in any suitable fashion. In this regard, EMA 222 may be a module that removably couples to housing 226. Moreover, EMA 222 may couple to housing 226 in any suitable orientation. For example, a longitudinal centerline A-A' of EMA 222 may be generally parallel to a top surface B of housing 226.

In various embodiments, EMA 222 may be operatively coupled to one or more hydraulic adjusters 224 (e.g. shown as hydraulic adjuster 224-1, hydraulic adjuster 224-2, hydraulic adjuster 224-3, hydraulic adjuster 224-4, hydraulic adjuster 224-5, and hydraulic adjuster 224-6). Each of EMA 222 and hydraulic adjuster 224 may be operatively installed on and/or contained on housing 226.

In various embodiments and with reference to FIG. 2A, hybrid brake actuator 220 may comprise and/or be configured with a supply of fluid (e.g., oil and/or hydraulic fluid). The fluid may be contained within a fluid reservoir and/or volume of housing 226, EMA 222, and/or hydraulic adjuster 224.

In various embodiments and with reference to FIG. 2A, housing 226 may comprise various volumes, ports, channels, and/or fluid passages. In this regard, the volumes, ports, channels, and/or fluid passages of housing 226 may be configured to conduct, transport, contain and/or store fluid (e.g., oil and/or hydraulic fluid). Moreover, the volumes, ports, channels, and/or fluid passages may operatively couple, facilitate, and/or enable fluid communication between EMA 222 and hydraulic adjuster 224. In this regard, EMA 222 may be electrically actuated to create a hydraulic pressure that may drive and/or actuate hydraulic adjuster 224.

Figure 3A:
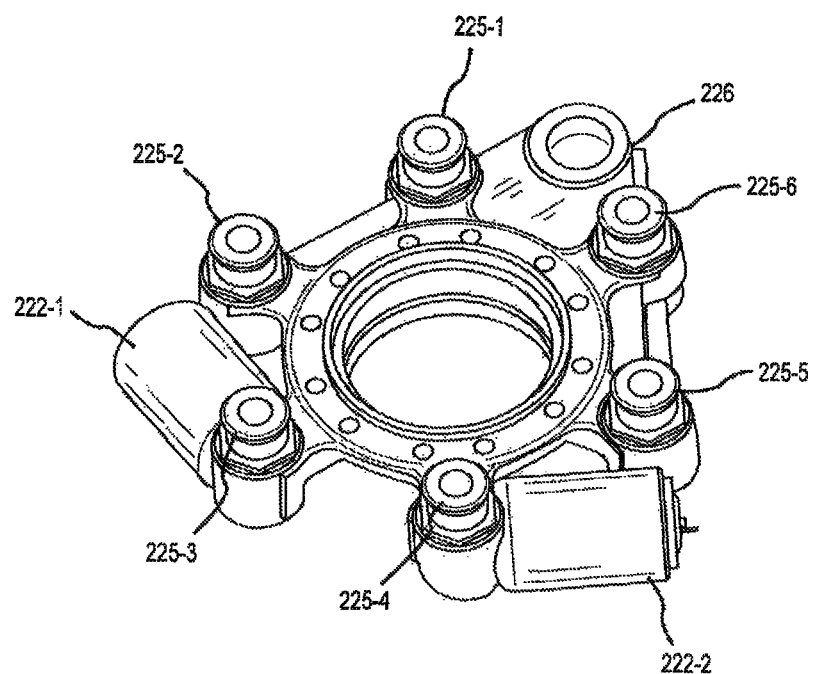
FIG. 3A illustrates a bottom perspective view of a first hybrid brake actuator, in accordance with various embodiments.

In various embodiments and with reference to the exemplary embodiments shown in FIGS. 2A and 3A, each hydraulic adjuster 224 may comprise piston 225 (e.g., shown as piston 2254, piston 225-2, piston 225-3, piston 225-4, piston 225-5, and piston 225-6). In this regard, piston 225 may be housed in and deploy from hydraulic adjuster 224 in response to fluid being displaced by EMA 222.

For example and with brief reference to FIGS. 2A and 3A, fluid from housing 226 (e.g., fluid may be contained in a volume defined by housing 226) may be displaced by EMA 222 to create hydraulic pressure. This hydraulic pressure may be conducted to one or more hydraulic adjusters 224 causing piston 225 to extend, actuate, and/or deploy from hydraulic adjuster 224. In operation, the fluid displaced by EMA 222-1 may drive and/or actuate hydraulic adjuster 224-1, hydraulic adjuster 224-2 and hydraulic adjuster 224-3. The fluid displaced by EMA 222-2 may drive and/or actuate hydraulic adjuster 224-4, hydraulic adjuster 224-5, and hydraulic adjuster 224-6. In this regard, fluid may be conducted from housing 226 and/or a fluid reservoir through one of more channels and/or ports in housing 226 to EMA 222, displaced by EMA 222 and conducted to one or more hydraulic adjusters 224 via the channels and/or ports of housing 226.

Figure 2B:
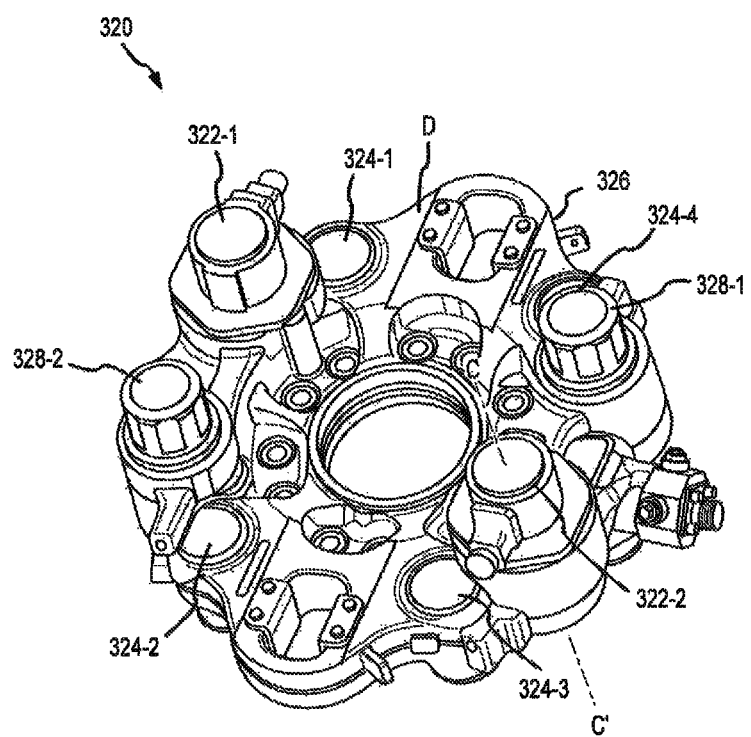
FIG. 2B illustrates a top perspective view of a second hybrid brake actuator, in accordance with various embodiments.

Similar to FIG. 2A, the exemplary embodiment shown in FIG. 2B may include a hybrid brake actuator 320 that may comprise one or more electric motor actuators 322 (e.g., shown as EMA 322-1 and EMA 322-2). EMA 322 may be coupled to and/or attached to housing 326 in any suitable fashion. In this regard, EMA 322 may be a module that removably couples to housing 326. Moreover, EMA 322 may couple to housing 326 in any suitable orientation. For example, a longitudinal centerline C-C' of EMA 322 may he generally perpendicular to a top surface D of housing 326.

In various embodiments, EMA 322 may be operatively coupled to one or more hydraulic adjusters 324 (e.g. shown as hydraulic adjuster 324-1, hydraulic adjuster 324-2, hydraulic adjuster 324-3, and hydraulic adjuster 324-4). Each of EMA 322 and hydraulic adjuster 324 may be operatively installed on and/or contained on housing 326.

In various embodiments and with continued reference to FIG. 2B, hybrid brake actuator 320 may comprise a fluid reservoir 328 (e.g., shown as fluid reservoir 328-1 and fluid reservoir 328-2 in FIG. 2B). Fluid reservoir 328 may be coupled to housing 326. Fluid reservoir 328 may also be in fluid communication with EMA 322, hydraulic adjustor 324, and/or housing 326.

In various embodiments and with reference to FIG. 2B, housing 326 may comprise various volumes, ports, channels, and/or fluid passages. In this regard, the volumes, ports, channels, and/or fluid passages of housing 326 may he configured to conduct, transport, contain and/or store fluid (e.g., oil and/or hydraulic fluid). Moreover, the volumes, ports, channels, and/or fluid passages may operatively couple, facilitate, and/or enable fluid communication between EMA 322, hydraulic adjuster 324, and/or fluid reservoir 328. In this regard, EMA 322 may be electrically actuated to create a hydraulic pressure that may drive and/or actuate hydraulic adjuster 324.

Figure 3B:
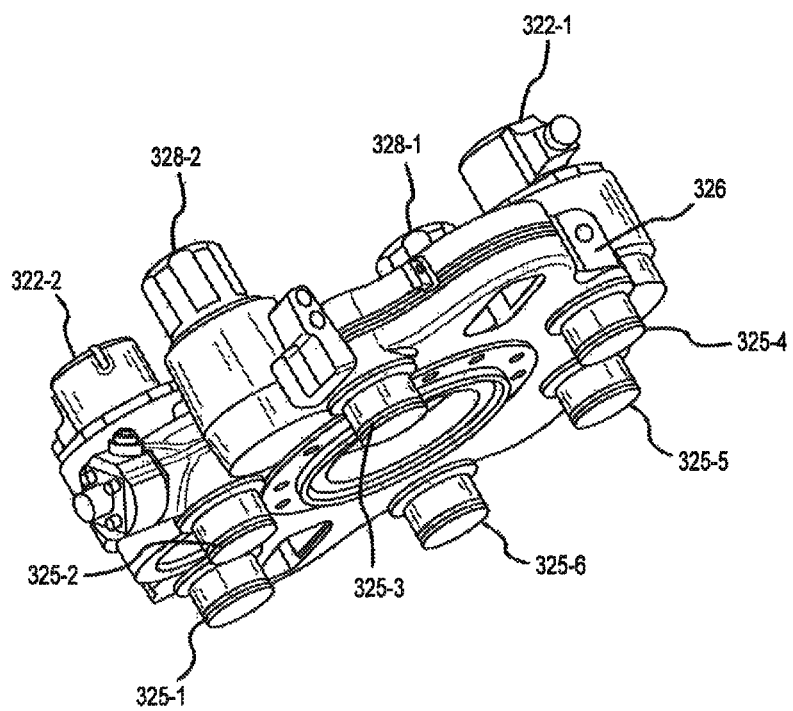
FIG. 3B illustrates a bottom perspective view of a second hybrid brake actuator, in accordance with various embodiments.

In various embodiments and with reference to the exemplary embodiments shown in FIGS. 2B and 3B, each hydraulic adjuster 324 may comprise piston 325 (e.g., shown as piston 325-1, piston 325-2, piston 325-3, piston 325-4, piston 325-5, and piston 325-6). In this regard, piston 325 may be housed in and deploy from hydraulic adjuster 324 in response to fluid being displaced by EMA 322.

For example and with brief reference to FIGS. 2B and 3B, fluid from fluid reservoir 328 may be displaced by EMA 322 to create hydraulic pressure. This hydraulic pressure may be conducted to one or more hydraulic adjusters 324 causing piston 325 to extend, actuate, and/or deploy from hydraulic adjuster 324, in operation, the fluid displaced by EMA 322-1 may drive and/or actuate hydraulic adjuster 324-1 and hydraulic adjuster 324-2. The fluid displaced by EMA 322-2 may drive and/or actuate hydraulic adjuster 324-3 and hydraulic adjuster 324-4. In this regard, fluid may be conducted from fluid reservoir 328 to through one of more channels and/or ports in housing 326 to EMA 322, displaced by EMA 322 and conducted to one or more hydraulic adjusters 324 via the channels and/or ports of housing 326.

Figure 4A:
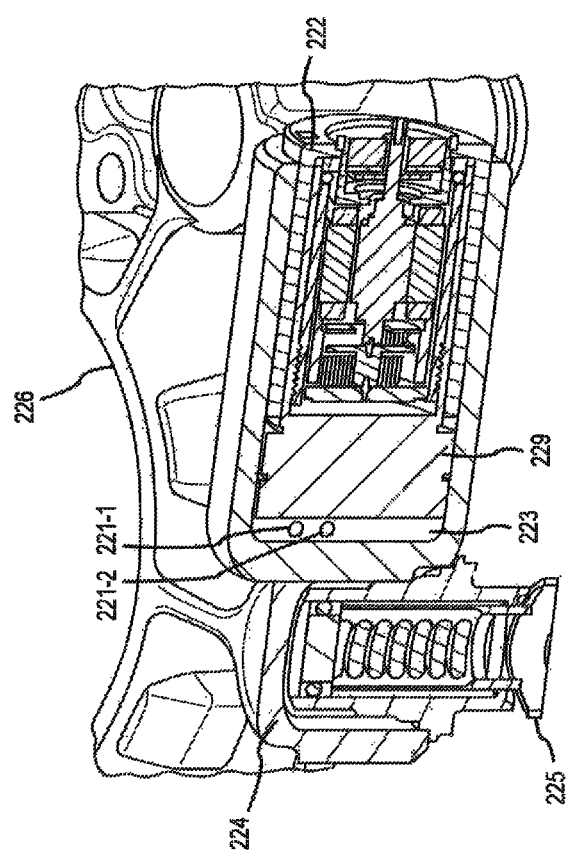
FIG. 4A illustrates a cross-sectional view of a portion of a first hybrid brake actuator, in accordance with various embodiments.

In various embodiments and with reference to the exemplary embodiment shown in FIG. 4A, housing 226 may define and/or comprise a compression chamber 223. EMA 222 may comprise a plunger 229 (e.g., a ram). Plunger 229 may be deployable into compression chamber 223. Compression chamber 223 may be configured to receive and/or may be in fluid communication with a fluid reservoir installed on the housing, and/or, although not shown, a fluid reservoir and/or volume defined within housing 226. Plunger 229 may be operatively coupled and/or capable of being driven by EMA 222. In this regard, plunger 229 may be configured to change the volume of compression chamber 223 and/or displace fluid in compression chamber 223.

In various embodiments, compression chamber 223 may further comprise one or more fluid ports 221 (e.g., shown as fluid port 221-1, and fluid port 221-2 in FIG. 4A). One or more fluid ports 221 may be configured to receive and exhaust fluid. In this regard, fluid may be conducted to a first fluid port 221 in response to a braking command. The fluid may be displaced by actuator 222 and exhausted from compression chamber 223 through a fluid port 221 to a hydraulic adjuster 224. The displaced fluid may cause piston 225 to further extend outward from hydraulic adjuster 224 to exert a force on the brake system and/or brake stack.

In various embodiments, hybrid brake actuator 220 may be configured as a redundant system. Hybrid brake actuator 2200 may be configured to operate with only one EMA 222 or with more than one EMA 222 installed on housing 226. For example, hybrid brake actuator 220 may be configured with two EMAs 222 (e.g., EMA 222-1 and EMA 222-2). In the event of a failure of a first EMA 222, a second EMA 222 may operate to provide a stopping force on the brake stack. In this regard, the stopping force applied by hybrid brake actuator 220 on the brake system and/or brake stack may be reduced, but may he sufficient to slow and/or stop an aircraft during a taxi or landing event.

Figure 4B:
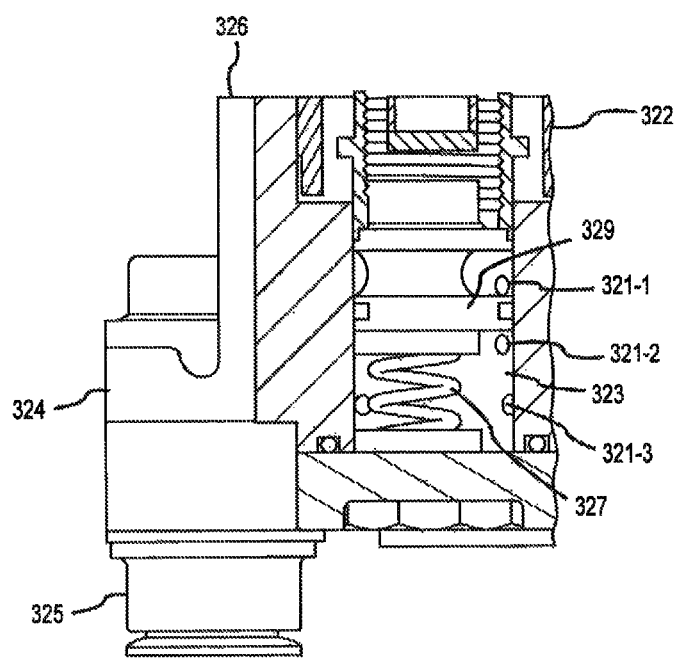
FIG. 4B illustrates a cross-sectional view of a portion of as second hybrid brake actuator, in accordance with various embodiments.

Similar to FIG. 4A, the exemplary embodiment shown in FIG. 4B, may include housing 326 that may define and/or comprise a compression chamber 323. EMA 322 may comprise a plunger 329 (e.g., a ram). Compression chamber 323 may be configured to receive and/or may be in fluid communication with a fluid reservoir (e.g., fluid reservoir 328, as shown in FIG. 2B) installed on the housing, and/or, although not shown, a fluid reservoir and/or volume defined within housing 326. Plunger 329 may be operatively coupled and/or capable of being driven by EMA 322. In this regard, plunger 329 may be configured to change the volume of compression chamber 323 and/or displace fluid in compression chamber 323.

In various embodiments, compression chamber 323 may further comprise one or more fluid ports 321 (e.g., shown as fluid port 321-1, fluid port 321-2, and fluid port 321-3). One or more fluid ports 321 may be configured to receive and exhaust fluid. In this regard, fluid may be conducted to a first fluid port 321 in response to a braking command. The fluid may be displaced by actuator 322 and exhausted from compression chamber 323 through a second fluid port 321 to a hydraulic adjuster 324. The displaced fluid may cause piston 325 to extend from hydraulic adjuster 324 to exert a force on the brake system and/or brake stack.

In various embodiments, hybrid brake actuator 320 may be configured as a redundant system. Hybrid brake actuator 320 may be configured to operate with only one EMA 322 or with more than one EMA 322 installed on housing 326. For example, hybrid brake actuator 320 may be configured with two EMAs 322 (e.g., EMA 322-1 and EMA 322-2). In the event of a failure of a first EMA 322, a second EMA 322 may operate to provide a stopping force on the brake stack. In this regard, the stopping force applied by hybrid brake actuator 320 on the brake system and/or brake stack may be reduced, but may be sufficient to slow and/or stop an aircraft during a taxi or landing event.

In various embodiments, as brake material wears from the brake stack due to braking operations and/or slowing down of an aircraft during a taxi or landing event, hydraulic adjusters 224 and 324 may extend outward to accommodate the gap created by the worn brake stack. In this regard, the fluid from a fluid reservoir (e.g. fluid reservoir 328 as shown in FIG. 2) and/or another suitable fluid reservoir contained within housings 226 and 326 flows to and remains within the respective hydraulic adjuster 224 and 324 to maintain an extended position of the respective pistons 225 and 325. Moreover, spring 327 may adjust and/o control the volume of compression chamber 323 to maintain a known volume of displacement. In this regard, the volume of displacement of compression chamber 323 may be designed to provide a repeatable three during operation while allowing fluid to remain in hydraulic adjuster 324. This may allow piston 325 to remain extended to accommodate for wear in the brake stack.

In various embodiments and with reference to FIGS. 2A-2B and 3A-3B, hybrid brake actuators 220 and 320 may be a modular design. In this regard, various components of hybrid brake actuators 220 and 320 such as, for example, EMAs 222 and 322, hydraulic adjusters 224 and 324, and/or fluid reservoir 328 may be removable and/or replaceable. For example, the various components may be threaded and/or screwed into the respective housings 226 and 326. This may improve the maintainability of hybrid brake actuators 220 and 320.

In various embodiments, hybrid brake actuators 220 and 320 may be scalable. For example, hybrid brake actuators 220 and 320 may comprise any suitable number of respective EMAs 222 and 322s and/or hydraulic adjustors 224 and 324s to create an adequate stopping force for a brake system and/or aircraft.

In various embodiments, hybrid brake actuators 220 and 320 may be self-contained. In this regard, hybrid brake actuators 220 and 320 may be a line replaceable unit. Moreover, hybrid brake actuators 220 and 320 may be replaceable by removing a first hybrid brake actuator 220 and 320 and installing a second hybrid brake actuator 220 and 320. In this regard, hybrid brake actuators 220 and 320 do not require additional installation steps that may be required of a typical hydraulic brake system such as, for example, bleeding and/or adjusting a typical hydraulic brake system.

In various embodiments, hybrid brake actuators 220 and 320 may be configured to work as a park brake when power is not being supplied by and/or to the aircraft. For example, EMAs 222 and 322 may be commanded to displace fluid causing respective hydraulic adjusters 224 and 324 to apply a force to the brake stack and/or brake system. In response to the power being removed and/or EMAs 222 and 322 being de-energized, the respective hybrid brake actuator 220 and 320 may maintain a braking force, where the displaced volume of the respective compression chamber 223 and 323 is maintained with the respective EMA 222 and 322 in the stopped position. The braking force may also be maintained with a solenoid valve.

As discussed herein, hybrid brake actuators 220 and 320 may be installed on any suitable aircraft wheel. Similarly, hybrid brake actuators 220 and 320 may be adapted to any suitable hydraulic and/or electromechanical brake system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid brake actuator, comprising:
    a housing configured to supply a fluid to a compression chamber;
    an electromechanical actuator (EMA) coupled to the housing and configured to create hydraulic pressure and thereby displace the fluid from the compression chamber; and
    a hydraulic adjuster configured to receive the fluid via the housing and in response to the EMA displacing the fluid,
    wherein the hydraulic adjuster is configured to exert a force on a brake stack;
    wherein the housing is disposed on the brake stack, and
    the EMA defines the compression chamber that is configured to receive fluid from the housing and supply fluid to the hydraulic adjuster.

2. The hybrid brake actuator of claim 1, further comprising a second EMA.

3. The hybrid brake actuator of claim 2, further comprising a second hydraulic adjuster.

4. The hybrid brake actuator of claim 3, wherein the EMA is configured to operate the hydraulic adjuster and the second EMA is configured to operate the second hydraulic adjuster.

5. The hybrid brake actuator of claim 1, further comprising a plurality of hydraulic adjusters.

6. The hybrid brake actuator of claim 1, further comprising a plurality of EMAs.

7. The hybrid brake actuator of claim 1, further comprising a fluid reservoir installed on the housing and configured to store the fluid.

8. The hybrid brake actuator of claim 1, wherein the hydraulic adjustor comprises a piston that is configured to extend from the hydraulic adjuster.

9. The hybrid brake actuator of claim 1, further comprising a spring disposed in the compression chamber.

10. The hybrid brake actuator of claim 1, further comprising a plunger operatively coupled to the EMA and deployable into the compression chamber.

11. An aircraft brake system, comprising:
    a brake stack; and
    a hybrid brake actuator configured to operatively couple to and compress the brake stack, the hybrid brake actuator comprising:
        a housing disposed on the brake stack and defining a first compression chamber and a second compression chamber,
        a first electromechanical actuator (EMA) coupled to the housing and configured to create hydraulic pressure and thereby displace a fluid in the first compression chamber in response to a braking command,
        a second EMA coupled to the housing and configured to create hydraulic pressure and thereby displace the fluid in the second compression chamber in response to the braking command,
        a first plurality of hydraulic adjustors configured to receive the fluid via the housing and in response to a first compression stroke of the first EMA, and a second plurality of hydraulic adjusters configured to receive the fluid via the housing and in response to a second compression stroke of the second EMA,
    wherein the first EMA defines the first compression chamber that is configured to receive fluid from the housing and supply fluid to the hydraulic adjuster, and
    the second EMA defines the second compression chamber that is configured to receive fluid from the housing and supply fluid to the hydraulic adjuster.

12. The aircraft brake system of claim 11, further comprising a fluid reservoir installable on the housing and configured to supply fluid to the housing.

13. The aircraft brake system of claim 11, wherein the EMA is removably coupled to the housing.

14. The aircraft brake system of claim 11, wherein the brake system is installable on a wheel.

15. The aircraft brake system of claim 11, wherein the second EMA is capable of operating the second plurality of hydraulic adjusters in response to the first EMA failing to operate.

16. The aircraft brake system of claim 11, wherein the first EMA comprises a first fluid port that receives fluid from at least one of the housing and the fluid reservoir, and a second fluid port that is configured to conduct fluid to the first plurality of hydraulic adjusters.

17. The aircraft brake system of claim 11, wherein the hybrid brake actuator is self-contained.

18. The aircraft brake system of claim 11, further comprising at least one spring disposed in at least one of the first compression chamber and the second compression chamber.

19. The aircraft brake system of claim 11, further comprising at least one plunger operatively coupled to at least one of the first EMA and the second EMA and deployable into at least one of the first compression chamber or the second compression chamber.

* * * * *